United States Patent [19]

Bauer

[11] 4,156,523
[45] May 29, 1979

[54] GAS SPRING SUITABLE AS A LIFTING AID FOR HATCHBACKS OR TRUNK LIDS OF MOTOR VEHICLES

[75] Inventor: Fritz Bauer, Schulzstrasse-14, Altdorf, Fed. Rep. of Germany, D-8503

[73] Assignee: Suspa Federungstechnik Fritz Bauer & Söhne OhG, Nuremberg, Fed. Rep. of Germany

[21] Appl. No.: 854,396

[22] Filed: Nov. 23, 1977

[30] Foreign Application Priority Data

Nov. 25, 1976 [DE] Fed. Rep. of Germany ....... 2653552

[51] Int. Cl.² .............................................. F16F 9/02
[52] U.S. Cl. ................................. 267/120; 267/65 R; 296/146
[58] Field of Search .................. 296/56, 146; 267/120, 267/69-74, 8 R, 64 R, 113, 118, 124; 188/282, 284, 300, 316; 16/51, 52, 66

[56] References Cited

U.S. PATENT DOCUMENTS

| 3,851,867 | 12/1974 | Fricko | 267/120 |
| 3,947,006 | 3/1976 | Bauer et al. | 267/120 |
| 4,045,008 | 8/1977 | Bauer | 267/120 |

Primary Examiner—David M. Mitchell
Assistant Examiner—Gene A. Church
Attorney, Agent, or Firm—Browdy and Neimark

[57] ABSTRACT

A gas spring suitable as a lifting means for a car hatchback includes a device to hold the gas spring piston rod in its extended position with the hatchback fully open. Such holding device comprises a pair of check valves associated with the guide piston of the gas spring whereby one such check valve is spring-biased closed so that a substantial closing force is required to initiate closing of the hatchback.

6 Claims, 8 Drawing Figures

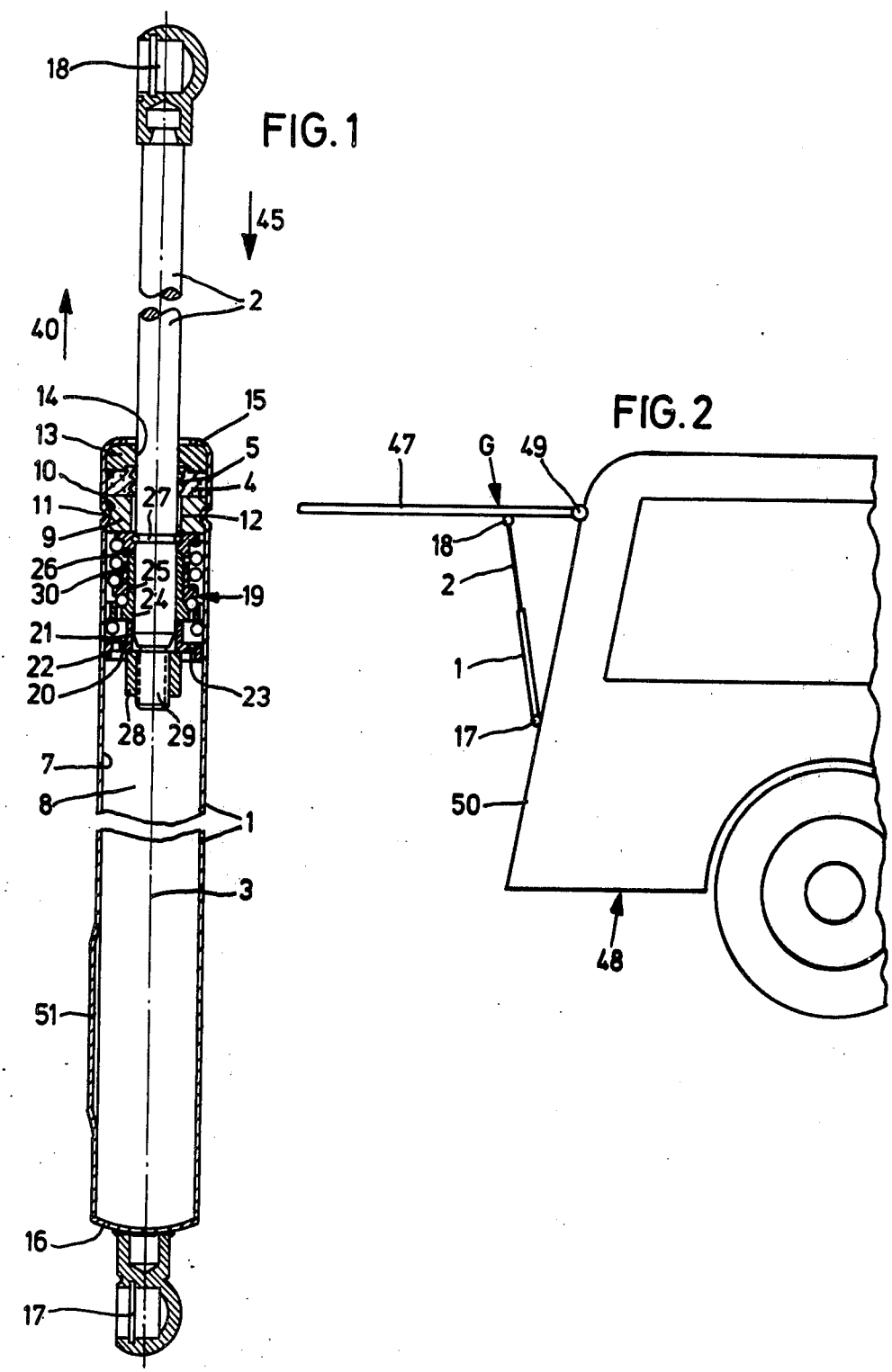

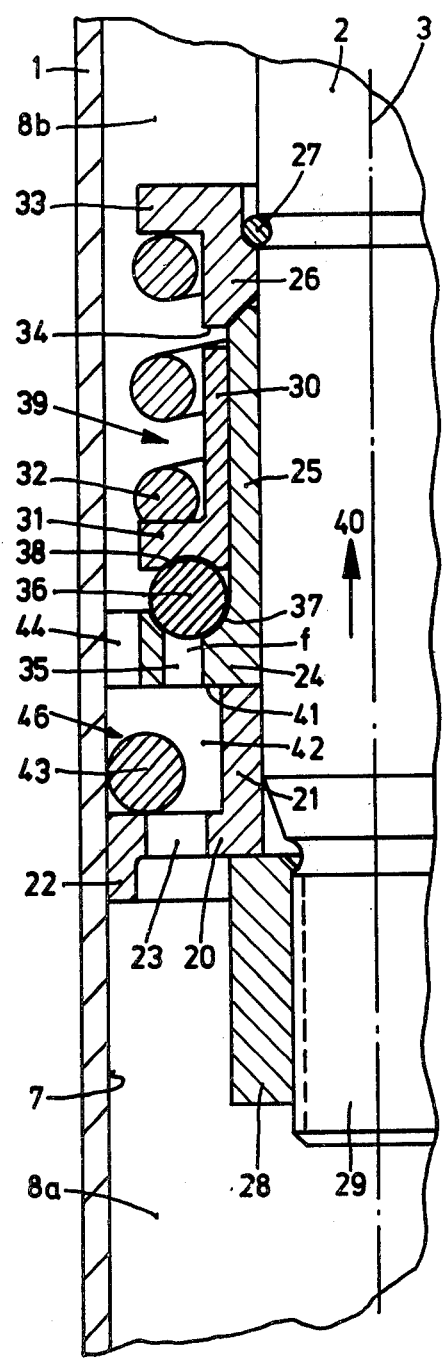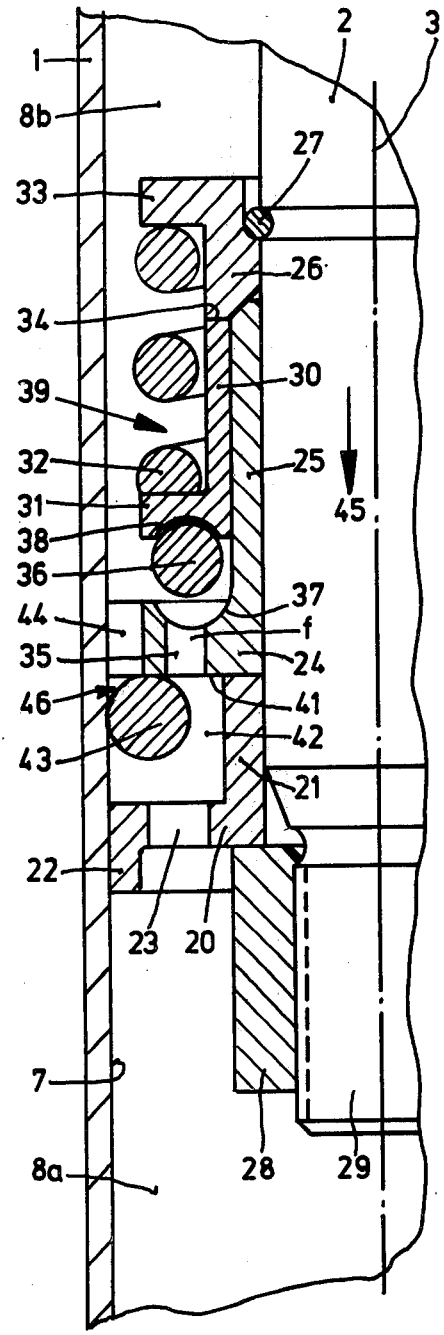

GAS SPRING SUITABLE AS A LIFTING AID FOR HATCHBACKS OR TRUNK LIDS OF MOTOR VEHICLES

FIELD OF INVENTION

The invention relates to gas springs, especially as a lifting aid for hatchbacks or trunk lids of motor vehicles or the like, consisting of a housing formed by a cylindrical tube, a piston rod mounted coaxially displaceably in said housing, the piston rod supporting a guide piston guided in a sealed manner against the inside wall of the housing, the guide piston being brought out in a gas-tight manner from one end of the housing and serving as a compressing piston, and a device to hold the piston rod in the extended position against a preset inserting force, whereby the guide piston is provided with at least one connecting passageway to connect the two housing chambers separated by said piston.

BACKGROUND OF THE INVENTION

U.S. Pat. No. 3,947,006 teaches a gas spring of the above-described type, wherein a lock washer is disposed in an annular groove on the outer circumferential surface of the guide piston, and wherein an annular recess is provided in the inside wall of the housing, the recess accepting the lock washer releasably with the piston rod in the extended position. When the piston rod is in its fully extended or withdrawn position, the lock washer engages the recess in the housing wall, locking the piston rod in this position. The piston rod can be pushed into the housing only when this locking force is overcome. The purpose of this feature is to prevent the hatchback or trunk lid or the like of a motor vehicle equipped with such a gas spring from swinging back down because of pressure losses in the gas spring caused by leaks in the seal or by a pressure loss produced by very low temperatures. A particular disadvantage of this known gas spring consists in the fact that the unlocking forces are difficult to determine in advance.

German Offenlegungsschrift No. 23,45,503 likewise teaches a gas spring of the type described above, wherein a mechanical lock is provided, engaging the extended piston rod, to achieve the same purpose, such locking device being formed by a locking cone or a rotating cam lock. This lock is released by pulling the piston rod first slightly out of the housing, then pushing it back into the housing. Hence, when using the hatchback or trunk lid of a motor vehicle, the hatchback or trunk lid must first be raised slightly, then swung down. If these operating instructions are not followed, and the hatchback or trunk lid is closed directly, the gas spring and its lock are destroyed, an obviously undesirable characteristic.

SUMMARY OF THE INVENTION

An object of the invention is to provide a gas spring of the type described above, wherein means specific to the gas spring are employed to lock the piston rod in the position in which it is extended from the housing, in the manner of a locking device; another object is to to overcome deficiencies in the prior art, such as those noted above.

These goals are achieved according to the invention by providing a guide piston having one or more passageways therethrough which passageways are always closed to the flow of gas in either one direction or the other such as by means of a pair of oppositely directed check valves. A first such check valve opens when the piston rod is pushed into the housing, but remains sealed when the piston rod is withdrawn. The second check valve seals tightly when the piston rod is pushed into the housing and opens when the piston rod is withdrawn or extended from the housing. The first check valve is pretensioned with a force which opposes its opening, this force being greater than the force exerted by the absolute gas pressure when the predetermined inwardly pushing force acts upon the first check valve in its opening direction.

The use of check valves on the guide pistons of gas springs to produce different amounts of damping as the piston rod is pushed into or extended from the housing is known. In this connection, the tightness of the check valve in the closed state is not important, since the damping process is of a purely dynamic nature.

In the present case, however, with a completely different function, the first completely tightly sealing check valve is pretensioned with a force sufficiently high that it opens only when the piston rod is stressed externally by a relatively high, considerably static force, such force in any case being greater than the force exerted by the weight of a hatchback, trunk lid, or the like bearing down on the piston rod. In this design, if the seal on the piston rod outlet side becomes leaky when the piston rod is in the extended or withdrawn position, the force required to push in the piston rod becomes even greater, so that in the event of an accident of this kind, with the hatchback or trunk lid or the like in the raised position, the gas spring acts as a safety support. By virtue of this design, the gas spring remains fully operable, especially in its upper locking function, even with considerable temperature drops to $-20°$ or $-40°$ C.

In order to allow the piston rod to be extended with as little interference as possible, it is advantageous for the second check valve to be designed as a flap valve.

In order to ensure that as much stress as possible is removed from the hatchback or trunk lid and its hinges with the piston rod in the withdrawn position, it is highly advantageous to provide a bypass channel which bridges the guide piston, at least in the vicinity of the piston rod when the latter is pushed in. This bypass channel can be made relatively long; the only critical feature is that it must not extend as far as the position in which the guide piston is located when the piston rod is in the extended or withdrawn position, e.g. when the hatchback is fully open. This bypass channel can be formed in an especially simple manner as axially parallel beads, grooves or channels in the inside wall of the housing. It is also advantageous if at least one connecting passageway and/or the check valves are made in the form of throttles.

BRIEF DESCRIPTION OF DRAWING

Further advantages and features of the invention will be obvious from the description of an illustrative embodiment with reference to the drawing.

FIG. 1 is a lengthwise section through a gas spring according to the invention;

FIG. 2 is a gas spring according to the invention, shown schematically, installed between the hatchback and body of a motor vehicle;

FIG. 3 is a guide piston of the gas spring shown in FIG. 1 on an enlarged scale, with the piston rod in the extended or withdrawn position;

FIG. 4 shows the guide piston of the gas spring according to FIG. 1 on an enlarged scale, with the piston rod pushed in;

DETAILED DESCRIPTION OF EMBODIMENT

Figure 5:
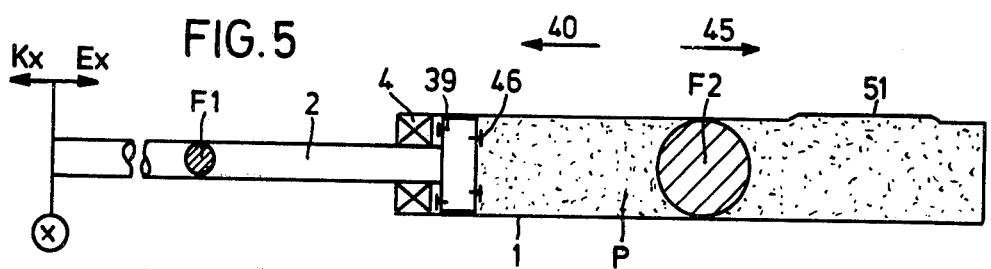
FIGS. 5-7 show the piston rod pushed in and/or extended to various degrees in the gas spring according to the invention, in a highly schematic representation.

The gas spring shown in the drawing consists of a circularly cylindrical housing 1 made, for example, of a steel tube, and being relatively long compared to its diameter and therefore slender. A piston rod 2, acting as a compressing piston, is mounted coaxially in the housing 1, the piston rod 2 likewise being cylindrical, with the axis 3 of piston rod 2 being identical to the axis 3 of housing 1. The housing 1, at its end from which the piston rod 2 extends, shown at the top in FIG. 1, is sealed by a lip seal 4, having its lips 5 resting against the absolutely smooth surface of piston rod 2.

The outer circumference of the lip seal 4 likewise rests against the inside wall 7 of the housing 1 in a sealing manner, so that this one seal alone ensures an absolutely tight sealing of housing 1 at the end from which the piston rod emerges. The lip seal 4 is mounted axially in a fixed position, facing the internal chamber 8 of housing 1, by means of a cylindrically annular holding element 9. This holding element 9 is provided on that part of its outer circumference which rests against the inside wall 7 of housing 1, with a radially indented, annular recess 10, into which the corresponding part of housing 1 fits with its bead 11. The holding element 9 is provided with a coaxial bore 12, whose diameter is larger than the diameter of piston rod 2.

The lip seal 4 is mounted axially at its outer end surface by a guide element 13, likewise somewhat cylindrically annular. This guide element 13 has a coaxial inner bore 14 which rests tightly against piston rod 2, so that piston rod 2 is guided radially in guide element 13, and so that no dirt can enter the seal 4 from outside. The guide element 13 is made of a material with good sliding properties relative to the material, e.g. steel, of the rod 2, e.g. the guide 13 may be formed of plastic, sintered material or the like. Such guide 13 is outwardly fastened in the axial direction in such manner that the outer edge 15 of housing 1 is turned over in an arc, radially inward about guide element 13.

The axial spacing of the holding element 9 and the guide element 13 is such that lip seal 4 is compressed axially to a desired extent, so that, by virtue of its elastic properties, it is pressed radially with a desired pretensioning on the one hand against the inner wall 7 of the housing 1 and, on the other hand, with its lips 5 in sealing engagement against the piston rod 2. The lip seal 4 is made of an elastic material, preferably rubber.

The housing 1 is sealed at the end opposite the lip seal 4 by a sealing cap 16 welded, for example, to the tube forming housing 1. A connecting element 17 suitable for the end-use application, for example, an eye or an element which forms a segment of a sphere, is fastened to this sealing cap 16 such as by welding. A connecting element 18 is mounted in similar fashion at the opposite free end of the piston rod 2. The use of connecting elements 17 and 18 in the shape of a segment of a sphere ensures that no bending moments can be conducted into the housing 1 and/or piston rod 2, so that the seal 4 is prevented from being made leaky as the result of irregular, radial stress.

A guide piston 19 is mounted at the inner end of the piston rod 2. This piston is provided with an annular guide plate 20, itself provided with an annular hub 21 pushed onto the piston rod 2, and a guide ring 22 resting against the inside wall 7 of housing 1. Connecting passageways 23 are provided, extending axially parallel through the guide plate 20, these passageways simultaneously acting as throttles, i.e., their cross sections are so small that flowable media such as gas or liquids are throttled as they pass through them. An annular valve plate 24 is mounted on the piston rod 2 against the hub 21 on the guide plate 20, the valve plate 24 being supported by a guide sleeve or bushing 25 on the piston rod 2. This guide bushing 25, in turn, axially abuts an annular stop 26 thereabove, this stop 26 being mounted on the piston rod 2 by means of a locking ring 27. The entire unit, composed of the guide plate 20 with its hub 21 and guide ring 22, valve plate 24 with its guide bushing 25 and stop 26, is tensioned against the locking ring 27 by a threaded nut 28, located below the guide plate 20, the threaded nut 28 being screwed onto a threaded pin 29 which constitutes the end of piston rod 2 within the housing 1.

An annular sliding bushing 30 is mounted with limited axial displaceability on the outer circumference of guide bushing 25, the sliding bushing 30 having an outwardly projecting flange 31 at its end opposite the stop 26, against which flange 31 a compression spring 32 rests, the spring 32 being pretensioned and in the form of a helical spring. This compression spring 32 abuts with its other end against a stop flange 33 of the stop 26. The stop 26 is also provided with a radially extending stop bead 34 which serves to limit the axial movement of the sliding bushing 30 toward the stop 26. At least one valve bore 35, extending axially parallel, is provided in valve plate 24, the bore 35 being sealed by an O-ring serving as a valve ring 36 and made of elastic sealing material.

In addition, a circular groove with a cross section in the form of a segment of a circle is provided in the upper surface of the valve plate 24 which is adjacent to flange 31, such groove serving as a seat 37 for the valve ring 36. The one or more valve bores 35 end in this seat 37. An annular recess 38 is also provided in the lower surface of flange 31 which is adjacent to valve ring 36, such recess likewise having a cross section in the form of a segment of a circle to accept the upper side of valve ring 36. As shown in FIGS. 3 and 4, the cross-sectional shape of the seat 37 and the recess 38 corresponds to the cross-sectional shape of valve ring 36, so that the ring is also guided exactly radially with respect to axis 3, in such manner that the valve ring 36 abuts the outer circumference of the guide bushing 25. A check valve 39 is thus formed by valve plate 24 with the guide bushing 25 and the valve bore(s) 35, the valve ring 36, the sliding bushing 30 with its flange 31, the stop 26 with its stop flange 33 and stop bead 34, and the compression spring 32, the check valve 39 being closed when piston rod 2 is extended from housing 1 in the direction indicated by arrow 40.

The guide plate 20, its hub 21, the corresponding part of inside wall 7 of the housing 1 and the corresponding surface 41 of valve plate 24 delimit a chamber 42 in which a second valve ring 43 is disposed, this valve ring 43 being pretensioned at its outer circumference against the inside wall 7 of housing 1. Such valve ring 43 likewise consists of elastic sealing material and is in the form of a O-ring. Valve channels 44, extending axially parallel, are disposed along the outer circumference of valve plate 24, the depth of such channels 44 being less than half the cross-sectional diameter of valve ring 43. When the piston rod 2 is pushed into the housing 1 in the direction indicated by arrow 45 in FIG. 4, the valve ring 43 comes to rest against the lower surface 41 of the valve plate 24, thereby sealing the valve channels 44. Contact is achieved by friction between the valve ring 43 and the inside wall 7 of the housing 1. When the piston rod 2 is extended in the direction indicated by arrow 40 in FIG. 3, the valve ring 43 comes to rest against the upper surface of the guide plate 20 thus opening the valve channels 44, without the connecting passageways 23 through the guide plate 20 being sealed, since their radial distance from the inside wall 7 of housing 1 is greater than half the cross-sectional diameter of valve ring 43. As indicated above, the valve ring 43, the valve channels 44, the lower surface 41 of the valve plate 24, and the corresponding delimiting upper surface of the guide plate 20 constitute a check valve 46, which is closed when the piston rod 2 is retracted in the direction indicated by arrow 45 into the housing 1, and which is opened when the piston rod 2 is extended from the housing 1 in the direction shown by arrow 40.

The use of a gas spring of this type as a lifting aid and support for a hatchback 47 of an automobile 48 is shown in FIG. 2. Here the connecting element 18 of the piston rod 2 is articulated in known fashion to the hatchback 47, which is pivotable about a horizontal swivel axis 49 on the body 50 of an automobile 48, while the other connecting element 17 of the housing 1 is articulated on the body 50 of the automobile 48. The interior 8 of the gas spring is filled with compressed gas, for example, nitrogen, and may also contain some oil.

In the vicinity of sealing cap 16, a bypass channel 51, extending parallel to the axis 3, is provided in the inside wall 7 of housing 1, the channel 51 being formed by a bead. When the guide piston 19 is in the vicinity of this bypass channel 51, it is bridged, so that compressed gas and/or fluid can flow past the guide piston 19, even when the check valves 39 and 46 are closed, from housing chamber 8a located between the guide piston 19 and the sealing cap 16 into housing chamber 8b located between the guide piston 19 and the holding element 9, and vice versa.

Figure 6:
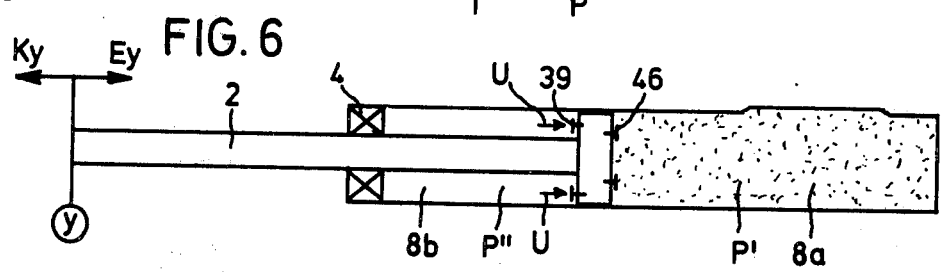
Figure 7:
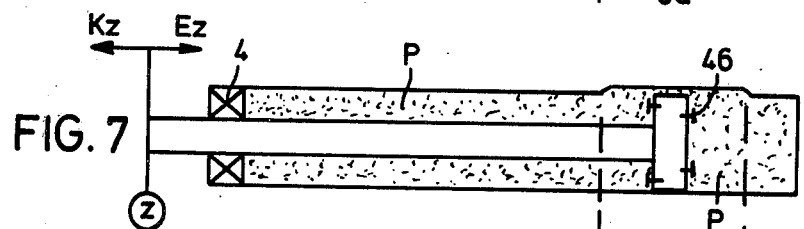
Figure 8:
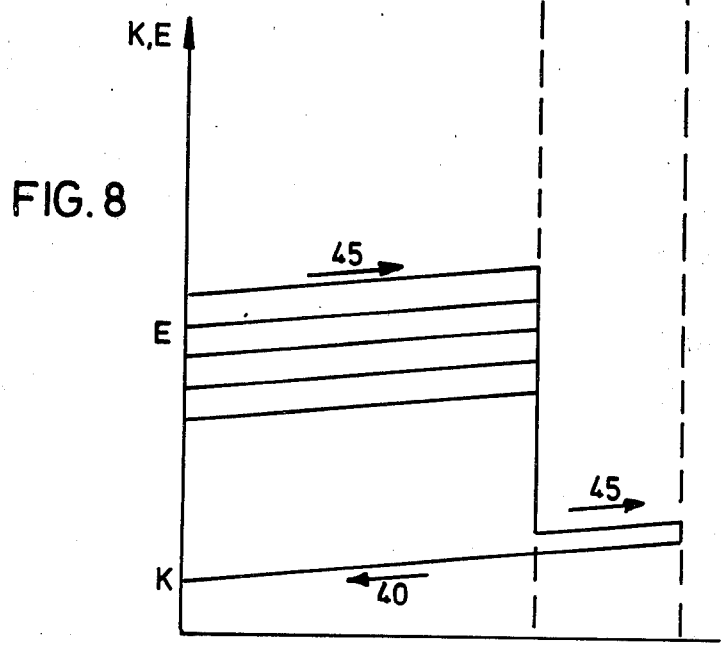
FIG. 8 is a graph showing the inserting and extending forces acting on a gas spring according to the invention along the path of the piston rod.

The operation of the gas spring is shown with reference to the highly schematic drawings in FIGS. 5–7 and with reference to the graph in FIG. 8, with simultaneous reference to FIGS. 1–4, whereby FIGS. 5–7 have the same reference numbers as FIGS. 1–4.

When the hatchback 47 is opened, i.e., when piston rod 2 is extended or withdrawn from the housing 1 in the direction indicated by arrow 40, the check valve 46 opens, in other words, valve ring 43 lifts off the valve channels 44 as a result of the friction against the inside wall 7 of the housing 1, and comes to rest against guide plate 20, as shown in FIG. 3. The expelling force acting on the piston rod 2, being outwardly directed, is $K = p \times F_1$, where
$K$ = the expelling force,
$p$ = the gas pressure in the inside chamber 8,
$F_1$ = a cross section of piston rod 2.
Hence, this is the manner in which a simple gas spring behaves.

When this expelling force K is insufficient to lift the hatchback 47, this lifting movement must be reinforced manually.

To close the hatchback 47, in other words, to cause piston rod 2 to be pushed in or retracted in the direction indicated by arrow 45 into the housing 1, a retracting force E must be exerted on piston rod 2 as follows:

$$E = p' \times F_2 - p'' \times (F_2 - F_1) + U$$

where
$p'$ = the gas pressure in housing chamber 8a, which depends upon the retracted position of piston rod 2,
$p''$ = the gas pressure in housing chamber 8b, which is a function of the retracted position of piston rod 2,
$U$ = the holding force of check valve 39 and
$F_2$ = the cross section of chamber 8.
This holding force U presses the valve ring 36 through the compression spring 32 against the seat 37 in front of the valve bore(s) 35. This valve ring 36 will be lifted off valve bore(s) 35 only when $$U = (p' - p'') \times f$$

where f = the total area of valve bore(s) 35. The position of the valve ring 36, lifted off the valve bore(s) 35, is shown in FIG. 4. Here the sliding bush 30 has come to rest against the stop bead 34 of stop 26.

The differences in gas pressures p' and p'' in housing chambers 8a and 8b when piston rod 2 is inserted into housing 1 result from the fact that the gas in housing chamber 8a must first be considerably compressed, before check valve 39 will open, in other words $$p' > p''.$$

The force required to slide the piston rod 2 into the housing 1 is greater than the force G exerted by gravity upon the hatchback 47 which is connected to piston rod 2 (see FIG. 2), so that an additional force, applied by hand, is necessary to swing down hatchback 47. Hatchback 47 therefore remains in the raised position once it has been placed there.

When the piston rod 2 has been slid far enough into housing 1 so that the guide piston 19 is bridged by bypass channel 51, the pressure in the two housing chambers 8a and 8b is balanced, in other words, the retracting force E is approximately equal to the expelling force K. The slight difference between E and K shown in FIG. 8 results from throttle losses.

For example, with the piston rod 2 in the extended position, in other words, with hatchback 47 in the raised position, if the seal 4 becomes leaky, a retracting force E' is required to slide the piston rod 2 into the housing 1 as follows:

$$E' = P' \times F_2 - p_0 \times F_2 + U.$$

where $p_0$ = atmospheric pressure.
Since
$p_0 < p''$ $E' > E.$

Hence, in this case the hatchback 47 will be held in its raised position.

If one or both of the check valves 39 and 46 fails or is damaged, a retracting force E'' is required to drive piston rod 2 into housing 1 as follows:

$E'' = p \times F_1$.

If $G > E''$, the hatchback 47 will sink slowly downward because of the throttle effect described above. But, if $G < E''$, the hatchback 47 will remain in the raised position.

In none of the defective conditions described above can the hatchback 47 fall freely and injure persons or property.

The pressure equilibrium described above and accomplished by the bypass channel 51 means that when piston rod 2 has been retracted a considerable distance into the housing 1, only slight forces are exerted upon it, so that in the closed state of hatchback 47, the latter and especially its hinges (swivel axis 49) and connecting elements 17 and 18 are free of loads. In addition, the lock of hatchback 47 is not subject to a stress, and this facilitates pressing the hatchback against the corresponding rubber gasket and snapping the lock shut.

If, as described above, the expelling force K is set so that it is insufficient to raise hatchback 47, this lifting movement must also be reinforced manually; the locking effect will then make itself felt with the hatchback in all tilted positions.

The foregoing description of the specific embodiment will so fully reveal the general nature of the invention that others can, by applying current knowledge, readily modify and/or adapt for various applications such specific embodiment without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A gas spring, especially suitable as a lifting aid for hatchbacks or trunk lids of motor vehicles, comprising a housing formed by a cylindrical tube, a piston rod disposed coaxially displaceably in said housing, a guide piston supported on said piston rod and guided in a sealed manner against the inside wall of the housing, said piston rod extending from one end of said housing in a gas-tight manner and serving as a compressing piston, gas under pressure within said housing, and means for holding the piston rod in the extended position against a predetermined retracting force, the improvement wherein
said means for holding the piston rod in the extended position comprises at least one connecting passage extending through said guide piston and valve means for said at least one connecting passage to prevent gas from flowing past said guide piston and permit gas to flow in only one direction at any one time through said at least one connecting passage, said valve means comprising at least one first check valve for said connecting passage, said valve being openable when said piston rod is pushed into said housing and tightly closable when said piston rod is withdrawn from said housing, and a second check valve for said passageway, said second check valve sealing tightly when said piston rod is pushed into said housing and opening when said piston rod is withdrawn from said housing, said first check valve being tensioned in the closed position with a holding means exerting a holding force which counteracts opening, said holding force being substantially greater than the force exerted by the absolute gas pressure at the start of retraction.

2. A gas spring according to claim 1, further comprising a bypass channel bridging said guide piston, located in the vicinity of the retracted position of said piston rod.

3. A gas spring according to claim 2, wherein said bypass channel is in the form of an axially parallel bead in the inside wall of said housing.

4. A gas spring according to claim 1, wherein said connecting passage is in the form of throttles.

5. A gas spring according to claim 1, wherein the second check valve is in the form of a flap valve.

6. A gas spring according to claim 1, wherein said passage is provided in three portions, a first said portion of said passage being of relatively small cross section and being closable by said first check valve, a second portion being in series with said first portion and always open, and a third portion being in parallel with said first portion and in series with said second portion and being closable by said check valve, said first and second check valves each comprising an O-ring.

* * * * *